United States Patent [19]
Takahashi et al.

[11] 4,423,446
[45] Dec. 27, 1983

[54] MAGNETIC DATA RECORDING AND READING DEVICE WITH MAGNETIC HEAD POSITIONING MECHANISM

[75] Inventors: Tuyoshi Takahashi, Odawara; Hiroshi Nishida, Kanagawa; Toshio Shiono, Odawara, all of Japan

[73] Assignee: Hitachi, Ltd., Tokyo, Japan

[21] Appl. No.: 240,560

[22] Filed: Mar. 4, 1981

[30] Foreign Application Priority Data

Mar. 5, 1980 [JP] Japan .................................. 55-26558

[51] Int. Cl.³ ............................................ G11B 21/08
[52] U.S. Cl. .................................... 360/106; 360/104
[58] Field of Search ................ 360/106, 105, 102–104, 360/109, 75

[56] References Cited

U.S. PATENT DOCUMENTS 3,124,789  3/1964  Wasylenko ........................ 360/103
3,539,191  11/1970  Yamamoto ...................... 360/109 X
4,131,923  12/1978  Wachs et al. ................... 360/109 X

FOREIGN PATENT DOCUMENTS 2653345  1/1978  Fed. Rep. of Germany ...... 360/106
46-31949  8/1967  Japan .................................. 360/109
1236483  6/1971  United Kingdom ................ 360/106
777700  7/1980  U.S.S.R. ............................. 360/105

Primary Examiner—John H. Wolff
Attorney, Agent, or Firm—Antonelli, Terry & Wands

[57] ABSTRACT

A magnetic data recording and reading device for a magnetic disk memory device including a spiral cam driven for rotation by a motor, a pivotal arm supporting a magnetic head at one end and a contact member at the other end for contacting the spiral cam, a pressing member for urging the contact member of the pivotal arm to press against the spiral cam, and a pivot for supporting the pivotal arm for pivotal movement. Upon rotation of the motor, the magnetic head at the one end of the pivotal arm is positioned on a magnetic disc to thereby effect magnetic recording and reading of data. The positioning of the magnetic head is effected in such a manner that the spiral cam rotated by the motor has the contact member of the pivotal arm press thereagainst to thereby move the pivotal arm in pivotal movement to permit the magnetic head to search along the magnetic disc.

6 Claims, 8 Drawing Figures

MAGNETIC DATA RECORDING AND READING DEVICE WITH MAGNETIC HEAD POSITIONING MECHANISM

BACKGROUND OF THE INVENTION

1. Field of the Invention

This invention relates to devices for recording and reading magnetically stored data for a magnetic disk memory device and more particularly it is concerned with data recording and reading device of the type described which uses a step motor as a source of drive force.

2. Description of the Prior Art

A magnetic disk memory device is provided with data recording and reading device for positioning a magnetic head on a track on a magnetic disc for magnetically recording or reading a particular item of data. One type of data recording and reading device of the prior art using a step motor comprises a carriage for supporting a magnetic head, guide rods for guiding the carriage in its linear motion, a belt secured at one end thereof to the carriage, and the step motor for moving the carriage in linear motion by driving the belt. In this type of data recording and reading device disclosed in U.S. Pat. No. 3,946,439, the belt is trained over a motor pulley of the step motor and another pulley and the carriage is supported on the belt. In this device, the motor pulley rotating in synchronism with the motor is rotated stepwise to move the belt, to thereby move the carriage. Another type of data recording and reading device is disclosed in U.S. Pat. No. 4,161,004 which comprises a mechanism including a motor pulley on which a belt is trained and a carriage having the belt screwed at opposite ends thereof, wherein rotation of the motor pulley drives the carriage. The data recording and reading devices of the prior art are intended to move a carriage of large mass at high speed in linear motion.

Owing to the inertia of the carriage, difficulties would be encountered in effecting positioning of the magnetic head at high speed with a high degree of accuracy. Particularly in an application wherein the magnetic head is positioned on a desired track in a period of time on the order of milliseconds on a magnetic disc on which tracks are located concentrically with a spacing interval of no greater than about 0.13 mm, the accuracy with which the magnetic head is positioned on the desired track would be greatly reduced due to the inertia of the carriage.

SUMMARY OF THE INVENTION

Accordingly, an object of this invention is to provide a device for recording and reading magnetically recorded data on a magnetic disc capable of effecting positioning of a magnetic head at high speed with a high degree of accuracy.

Another object of the present invention is to provide a device for magnetically recording and reading data of simple construction with a minimum number of parts which is capable of effecting positioning of the magnetic head at high speed with a high degree of accuracy.

The aforesaid objects of the invention are accomplished by means of data recording and reading device comprising a spiral cam driven for rotation by a motor, a pivotal arm supporting a magnetic head at one end thereof and formed at the other end thereof with a contact portion for contacting the spiral cam, a pivot on which the pivotal arm is supported, and means for urging the contact portion of the pivotal arm to press against the spiral cam, wherein rotation of the spiral cam drives the pivotal arm for pivotal movement. The means for urging the contact portion of the pivotal arm to press against the spiral cam may comprise a spring adapted to pull the pivotal arm in a direction in which the contact portion of the pivotal arm presses against the spiral cam, or a spring adapted to impart a torque of rotation to the pivot of the pivotal arm in a direction in which the contact portion of the pivotal arm presses against the spiral cam. The contact portion of the pivotal arm may comprise a rotatable roller.

DESCRIPTION OF THE PREFERRED EMBODIMENTS

Figure 1:
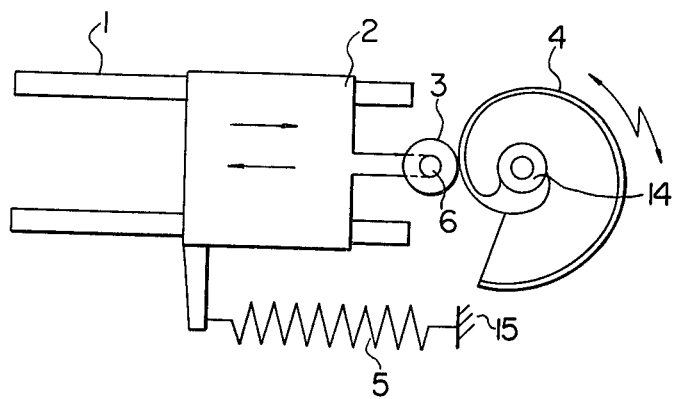
FIG. 1 is a schematic view of a data recording and reading device wherein the carriage is moved in linear motion by the rotating spiral cam to effect positioning of the magnetic head.

Before describing the preferred embodiments of the invention, the principle of a device for magnetically recording and reading data using a spiral cam for positioning a magnetic head driven for movement in linear motion will first be outlined by referring to FIG. 1. The recording and reading device shown in FIG. 1 comprises guide rods 1, a carriage 2 supporting a magnetic head movable along the guide rods 1 in linear motion, a spiral cam 4 driven for stepwise rotation about a motor pulley 14 of a step motor, a cam roller 3 supported for rotation by a rotary shaft 6 at one end of the carriage 2 positioned against the spiral cam 4, and a spring 5 mounted between the carriage 2 and a fixed part 15 for urging the cam roller 3 on the carriage 2 to press against the spiral cam 4. As the spiral cam 4 is driven for stepwise rotation by the step motor while being maintained at its periphery in contact with the cam roller 3, the carriage 2 is moved in linear motion along the guide rods 1, to thereby position the magnetic head on the carriage 2 on the magnetic disc. The spiral cam 4 is shaped such that its radius from its center on the motor pulley 14 to its outer periphery is continuously changed.

Figure 2:
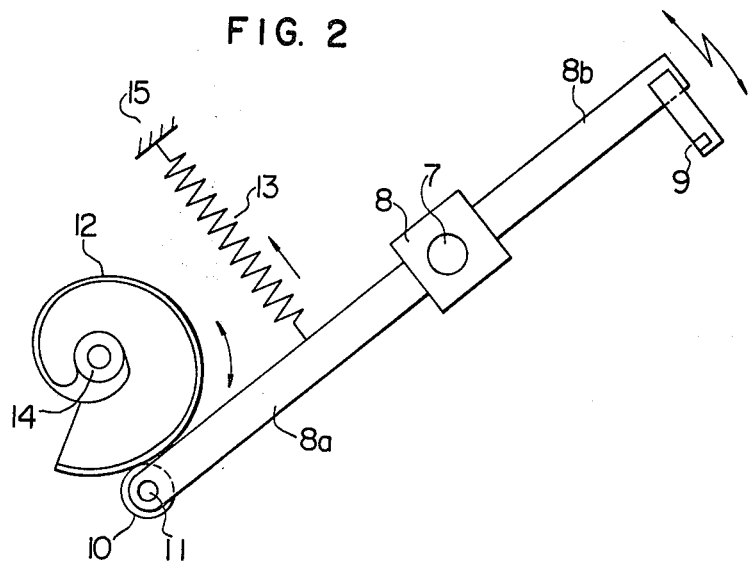
FIG. 2 is a schematic view showing the principle of the device for magnetically recording and reading data of the pivotal access type using a spiral cam according to the invention.

FIG. 2 shows a device for magnetically recording and reading data comprising one embodiment of the invention and explains its principle. The recording and reading device comprises a spiral cam 12 directly connected to a motor pulley 14 of a step motor, a pivotal arm 8 including arm portions 8a and 8b pivotally supported on a pivot 7, a cam roller 10 supported on one end of the arm portion 8a, and a spring 13 urging by its biasing force the cam roller 10 to press against the spiral cam 12. The cam roller 10 supported on one arm portion 8a is rotatable about a pin 11, and the other arm portion 8b supports a magnetic head 9 on one end. The spring 13 is mounted between the arm portion 8a and a fixed part 15, to urge the arm portion 8a to move toward the fixed part 15.

The data recording and reading device shown in FIG. 2 operates as follows. When the spiral cam 12 is rotated clockwise, for example, the arm 8 is pivotally moved clockwise about the pivot 7 because the arm portion 8a is pulled by the spring 13 toward the fixed part 15, so that the magnetic head 9 at one end of the arm portion 8b carries out seeking operation clockwise on the magnetic disc. Conversely, when the spiral cam 12 is rotated counterclockwise, the arm 8 moves counterclockwise in pivotal movement about the pivot 7 against the biasing force of the spring 13, so that the magnetic head 9 at one end of the arm portion 8b carries out seeking operation counterclockwise.

The magnetic data recording and reading device according to the invention includes a magnetic head access mechanism of the rotary access system. The main reason why the rotary access system is adopted is that when the rotary access system is adopted the movable arm (carriage) supporting the magnetic head develops less inertia than when the linear access system is adopted.

Figure 3:
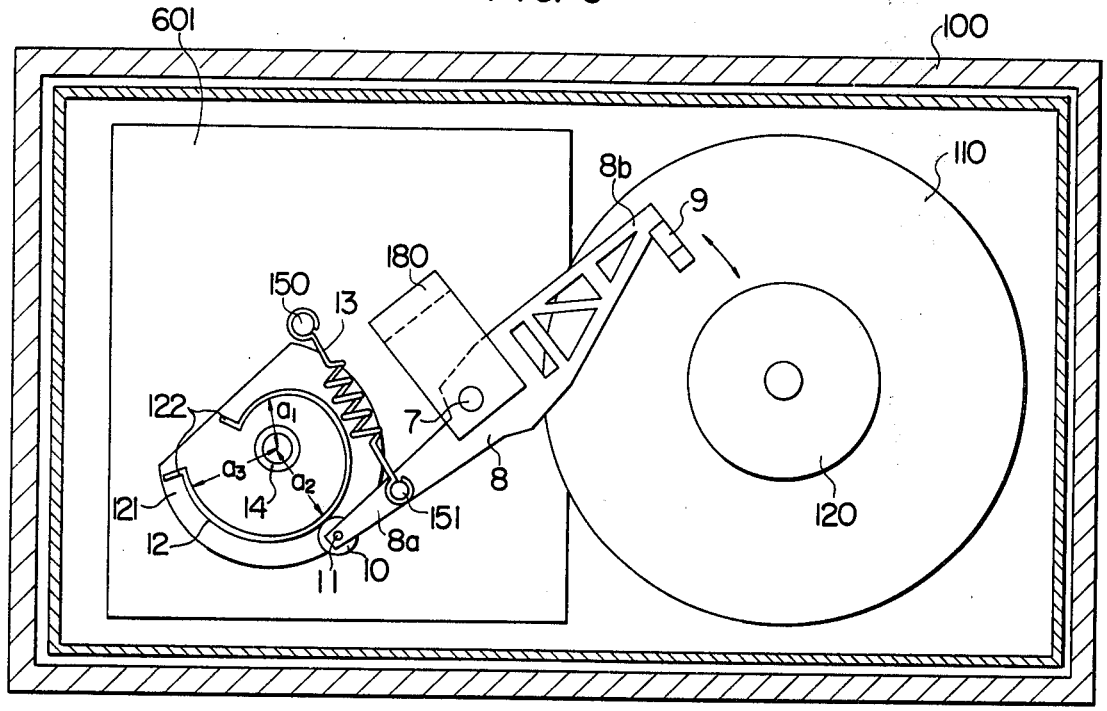
FIG. 3 is a sectional plan view of a magnetic disk memory device comprising the recording and reading device comprising one embodiment of the invention.
Figure 4:
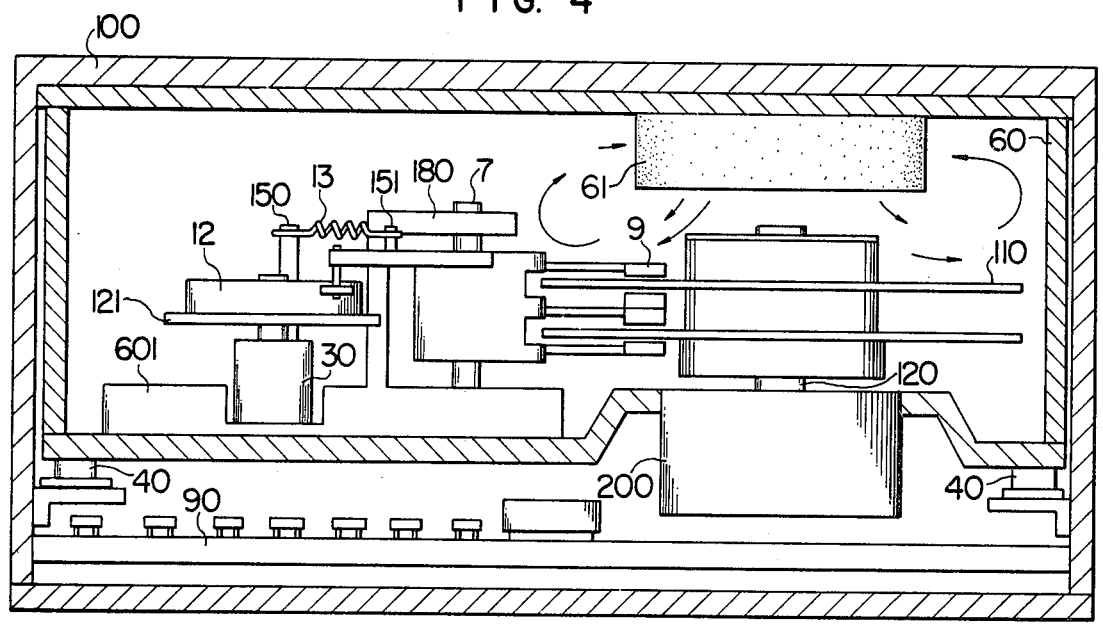
FIG. 4 is a sectional side view of the magnetic disk memory device shown in FIG. 3.
Figure 5:
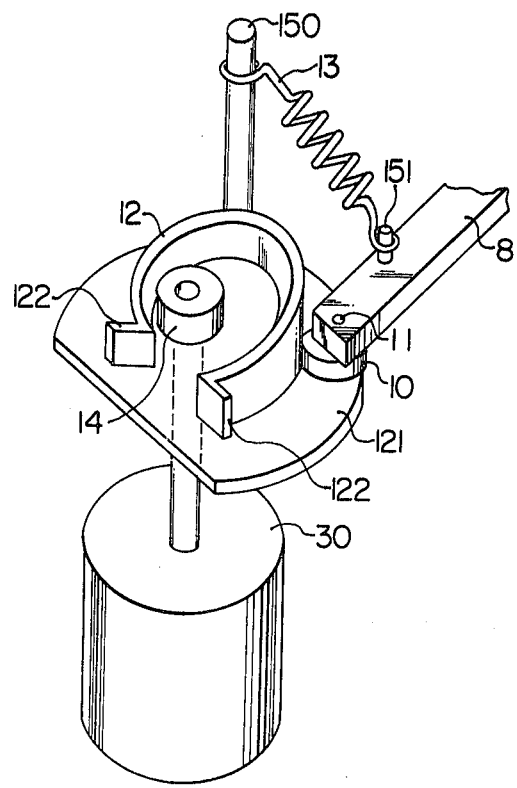
FIG. 5 is a view, on an enlarged scale, of the spiral cam and the cam roller of the recording and reading device of the magnetic disk memory device shown in FIG. 3.

FIGS. 3-5 show a magnetic disk memory device incorporating therein the magnetic data recording and reading device according to the invention shown in FIG. 2. FIG. 3 is a plan view of the magnetic disk memory device having the recording and reading device according to the invention, and FIG. 4 is a side view of the magnetic disk memory device shown in FIG. 3.

As shown, the magnetic disk memory device comprises a shroud 60 for hermetically containing therein a magnetic disc 110 supported by a spindle 120 of a spindle motor 200, the magnetic data recording and reading device, and a filter 61 for cleaning the air in the shroud 60. The shroud 60 is enclosed in an outer casing 100 together with an electronic circuit section 90 for controlling various electronic circuits.

The magnetic data recording and reading device comprises the pivotal arm 8 supporting the magnetic head 9 at one end thereof and the cam roller 10 at the other end thereof for rotation, a block 180 supporting the arm 8 for pivotal movement about the pivot 7, a cam base 121 supporting the motor pulley 14 of a step motor 30 and the spiral cam 12, a pin 151 connected to the arm 8 at a point nearer to the other end thereof than to the one end thereof, another pin 150 connected to a shroud base 601 of the shroud 60, and the spring 13 mounted between the two pins 150 and 151. Stoppers 122 are disposed at opposite ends of the spiral cam 12 for preventing the cam roller 10 from being dislodged from the spiral cam 12 when the step motor 30 overruns.

The relation between the spiral cam 12 and the cam roller 10 on the pivotal arm 8 will be described in detail by referring to FIG. 5. The motor pulley 14 secured to a rotary shaft of the step motor 30 is mounted on the cam base 121 supporting the spiral cam 12 which rotates in synchronism with rotation of the step motor 30. The cam roller 10 supported on the one end of the pivotal arm 8 for rotation about the pin 11 is pressed against the spiral cam 12 by the biasing force of the spring 13 mounted between the two pins 150 and 151. Thus upon rotation of the step motor 30 the spiral cam 12 presses the cam roller 10 on the pivotal arm 8 to drive the latter to move in reciprocatory pivotal movement.

The operation of the magnetic head access mechanism of the embodiment shown in FIGS. 3-5 will be described. As shown in FIG. 3, the magnetic head 9 is positioned on a track substantially in the center of the surface of the magnetic disc 110. When the magnetic disc 110 disposed in this position is desired to be moved in seeking operation toward the inner periphery with respect to this track, the step motor 30 is rotated clockwise, and the spiral cam 12 is also rotated clockwise in synchronism with the motor 30. As the spiral cam 12 rotates, the radius of the spiral cam 12 in contact with the cam roller 10 is progressively reduced, so that the arm 8 is pulled by the spring 13. Thus the magnetic head 9 supported at the end of the arm portion 8b is moved toward the inner periphery of disc 110 to seek along the disc to locate a desired position on a desired track or a particular item of data as desired.

Conversely, when the magnetic head 9 is desired to be moved in seeking operation toward the outer periphery with respect to the track, the step motor 30 is rotated counterclockwise. This causes the spiral cam 12 to rotate counterclockwise, so that the radius of the spiral cam 12 in contact with the cam roller 10 progressively increases. Thus the arm portion 8b moves in pivotal movement counterclockwise against the biasing force of the spring 13, and the magnetic head 9 is moved toward the outer periphery of the disc 110 to seek along the disc to locate a desired position on a desired track or a particular item of data.

As described in detail hereinabove, the magnetic data recording and reading device according to the invention utilizes a spiral cam wherein the radius or the distance between the center and the outer periphery is progressively varied, to thereby drive the pivotal arm for pivotal movement by the rotary reciprocatory movement of the spiral cam.

Figure 6:
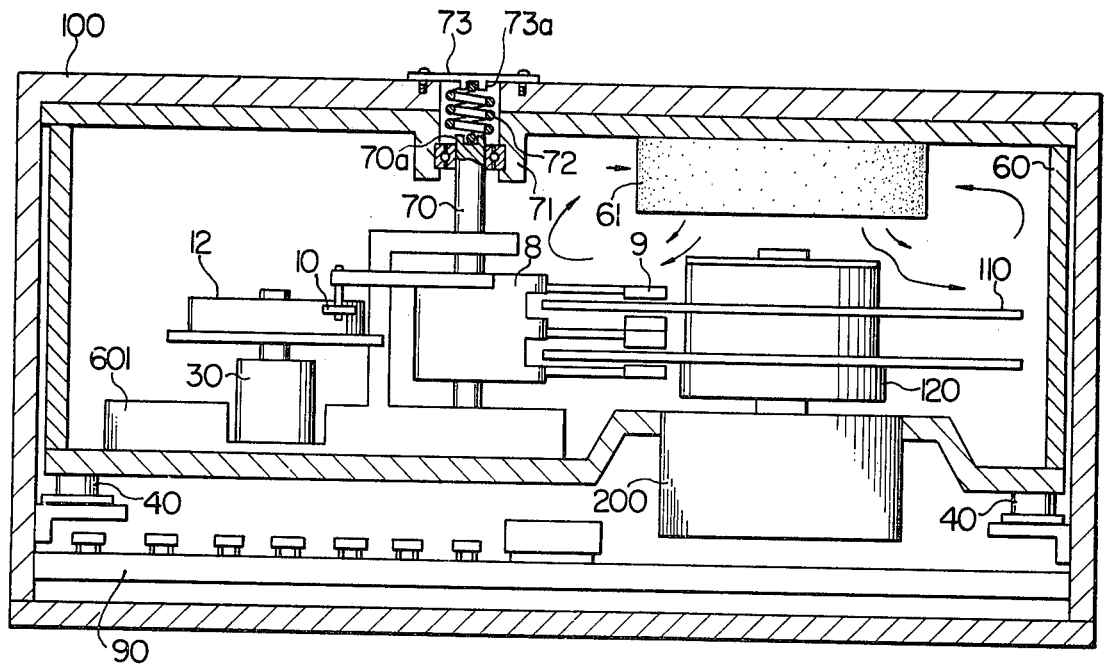
FIG. 6 is a sectional side view of a magnetic disk memory device comprising a device for magnetically recording and reading data comprising another embodiment of the invention.

FIG. 6 shows another embodiment of the magnetic data recording and reading device in conformity with the invention which comprises, in addition to the spiral cam 12, the cam roller 10 adapted to be pressed by the spiral cam 12, and the pivotal arm 8 supporting the magnetic head 9 on one end thereof and the cam roller 10 for rotation at the other end thereof, a groove 70a formed at the upper end of a pivot 70 supporting the pivotal arm 8 for pivotal movement, and a spring 72 imparting a torque to the pivot 70 for causing the cam roller 10 to press against the spiral cam 12. The spring 72 is mounted between the groove 70a of the pivot 70 supported at opposite ends through a bearing 71 and given with the torque and a groove 73a formed at a cover 73 screwed to the outer casing 100. With the pivotal arm 8 being under the influence of a torque of rotation at all times, the spiral cam 12 is caused to press the cam roller 10 at all times. By this arrangement, the magnetic head 9 is moved to seek along the disc 110 to locate a desired position on a desired track or a particular item of data as desired as the spiral cam 12 moves in reciprocatory rotary movement.

Figure 7:
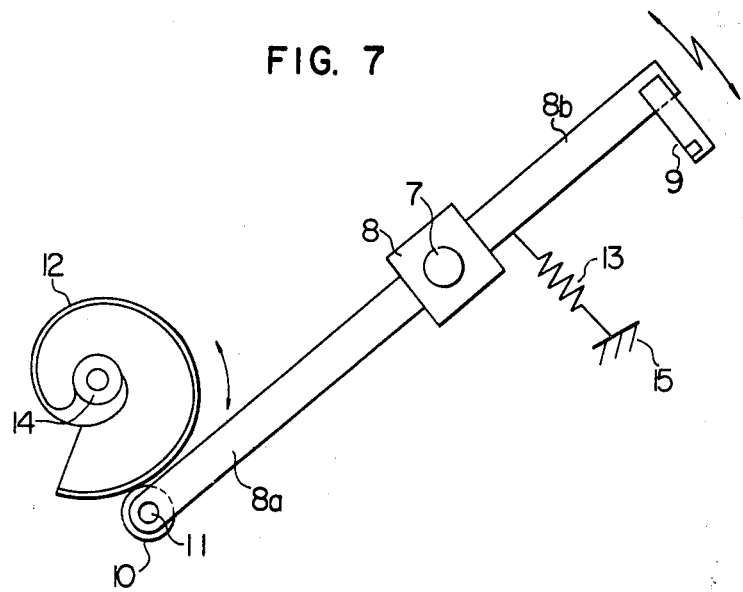
FIG. 7 is a view showing the principle of the device for magnetically recording and reading data comprising still another embodiment of the invention.

FIG. 7 is a view showing the principle of a modification of the magnetic head positioning mechanism of the magnetic data recording and reading device according to the invention. As shown, the arm portion 8b supporting the magnetic head 9 is pulled by the spring 13 to thereby urge the cam roller 10 on the arm portion 8a to press against the spiral cam 12. Thus the reciprocatory rotary movement of the spiral cam 12 taking place in synchronism with the rotation of the spindle pulley 14 causes the arm 8 to move in reciprocatory pivotal movement about the pivot 7, to thereby permit the magnetic head 9 on the arm portion 8b to seek along the disc.

Figure 8:
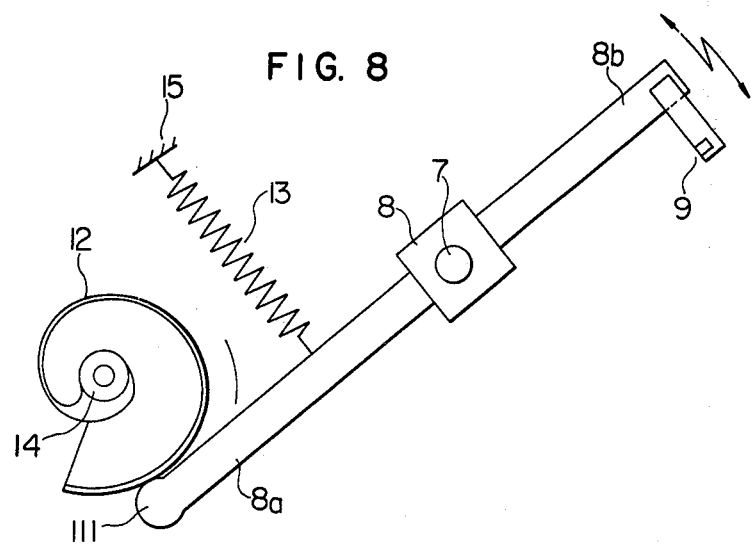
FIG. 8 is a view showing the principle of the device for magnetically recording and reading data comprising a further embodiment of the invention.

FIG. 8 shows the principle of another modification of the magnetic head positioning mechanism according to the invention. As shown, the arm portion 8a is pressed by the spiral cam 12 at an end portion thereof which is formed, instead of having the cam roller 10, a contact portion 11 of the least surface friction resistance. Thus as the spiral cam 12 moves in reciprocatory rotary movement, the contact portion 11 of the arm portion 8a slides along the outer periphery of the spiral cam 12 and causes the pivotal arm 8 to perform a seeking operation.

From the foregoing description, it will be apparent that the magnetic head positioning mechanism according to the invention operates such that the pivotal arm is pressed at one end thereof against the spiral cam driven for rotation by the motor, and the pivotal arm is driven for pivotal movement by the rotation of the spiral cam. This feature ables the following effects to be achieved:

(1) The use of a pivotal arm produces less inertia than otherwise, so that positioning of the magnetic head can be effected at high speed with a high degree of accuracy. The use of a motor of low torque is conducive to achieving positioning of the magnetic head at high speed with a high degree of accuracy.

(2) The pivotal arm driven by the spiral cam permits positioning of the magnetic head to be effected by accurately following the angle of rotation of the motor.

What is claimed is:

1. A magnetic data recording and reading device for a magnetic disc memory device comprising:

a magnetic head to be positioned on a magnetic disc for effecting magnetic recording and reading of data, the magnetic disc being arranged to rotate about a first axis;

a cam rotatable about a second axis which is substantially parallel to said first axis, said cam being provided with a discontinuous spiral outer cam surface terminating in two opposite ends;

a pivotal arm supporting said magnetic head at one end thereof and contact means at the opposite end thereof, said contact means being adapted to contact said cam surface;

pivot means supporting said pivotal arm at a portion between said one end and said opposite end for pivotal movement of said pivotal arm about a third axis substantially parallel to said first axis;

means for biasing said pivotal arm so that said contact means is kept in contact with said cam surface, said contact means being adapted to cooperate with each of the ends of said cam surface for positively limiting excursion of said magnetic head across the magnetic disc; and a motor for rotating said cam about said second axis, whereby rotation of said cam pivotally moves said pivotal arm to thereby move said magnetic head across the magnetic disc.

2. A device as claimed in claim 1, wherein said cam is provided with stopper means at the opposite ends of said cam surface.

3. A device as claimed in claim 1, wherein said contact means comprises a freely rotatable roller supported by said pivotal arm and in contact with said cam surface.

4. A device as claimed in claim 1, wherein said pivot means comprises a rotary shaft rigidly secured to said pivotal arm and bearing means for rotatably supporting said rotary shaft.

5. A device as claimed in claim 4, wherein said means for biasing said pivotal arm comprises a torsion spring connected to said rotary shaft to impart a torque to said rotary shaft.

6. A device as claimed in any one of claims 1-3, wherein said means for biasing said pivotal arm comprises a coil spring connected to said pivotal arm at a position between said pivot means and said contact means to apply a force to said pivotal arm so that said contact means is forced against said cam surface.

* * * * *